United States Patent Office 3,178,779
Patented Apr. 20, 1965

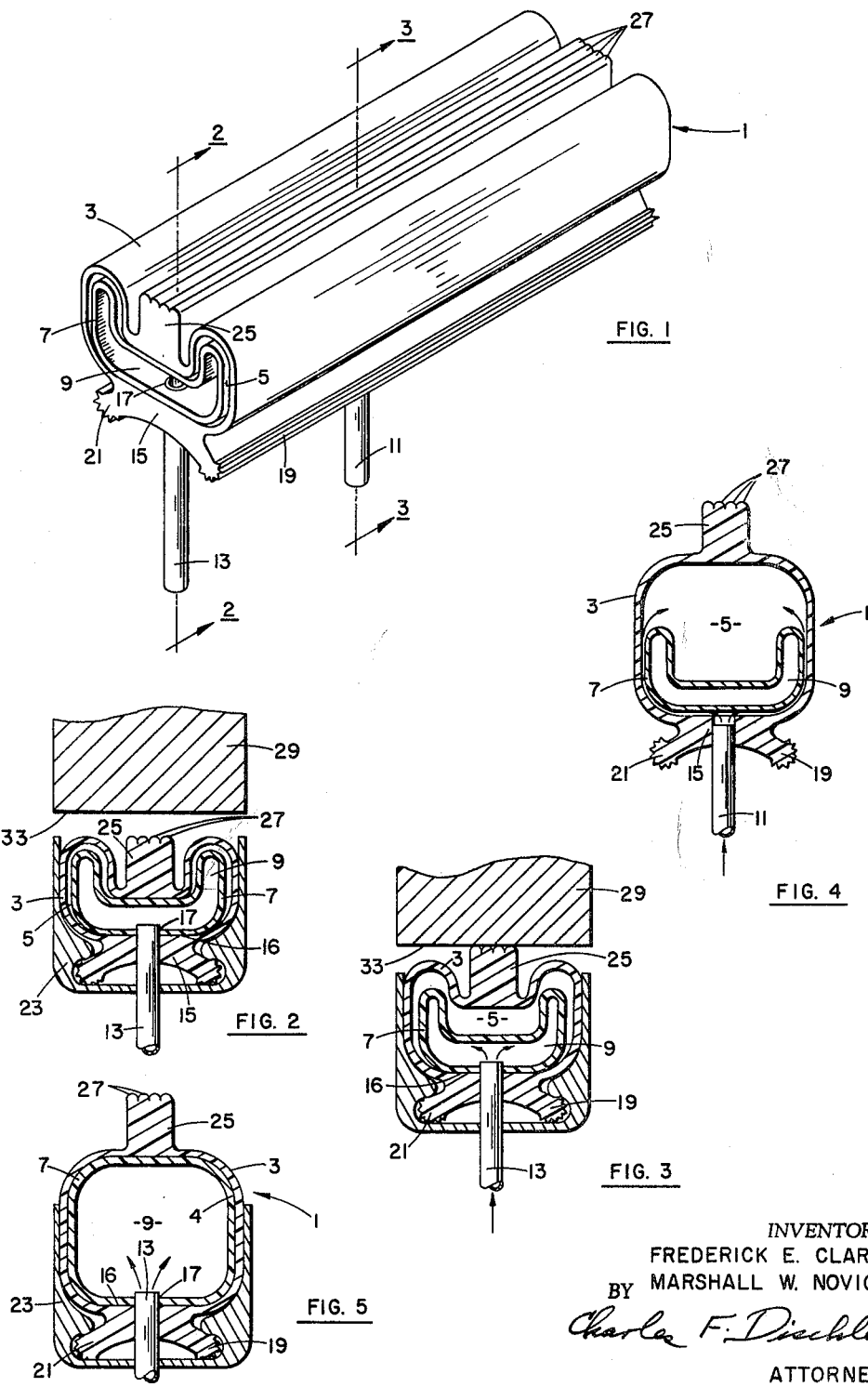

3,178,779
MULTI-CELL INFLATABLE SEAL
Frederick E. Clark, Santa Monica, and Marshall W. Novick, Los Angeles, Calif., assignors to North American Aviation, Inc.
Filed June 28, 1962, Ser. No. 205,909
3 Claims. (Cl. 20—69)

This invention relates to elastomeric seals and, in particular, to inflatable seals for the sealing of doors, canopies, escape hatches and other sealed apertures located in walls and bulkheads between pressurized and unpressurized compartments.

Seals of the stated type find particular usage in aircraft utilizing pressurized cabins and compartments. Heretofore, such standard inflatable seals have been of a single cell construction inflated by pressurized air from the aircraft's pneumatic system. The details of such a construction are disclosed in U.S. Patent No. 2,720,011. A seal of this type, however, since it is generally in an exposed location, is susceptible to damage from maintenance personnel, as well as excessive wear, each of which tends to cause early failure of the seal structure. Failure of such a seal during flight could have catastrophic effects both on personnel and on the aircraft structure. The present invention provides a sealing means whereby an additional 100% safety factor is provided in the use of sealed pressurized compartments of aerial vehicles operating at high speeds and extremely high altitudes.

The seal of the present invention provides a double cell seal assembly having separate outer and inner cells with a separate air pressure inlet-outlet for each cell thereby allowing for differential inflation of the inner and outer cells in a predetermined manner to provide a "fail-safe" feature so that, upon failure of the outer cell for any reason, the inner cell expands and provides the necessary sealing force.

Accordingly, a primary object of this invention is the provision of a multi-cell seal assembly having separately pressurized chambers for insuring continued sealing despite failure of one of such cells.

Another object of this invention is the provision of a multi-cell seal assembly having separately pressurized inner and outer cells wherein each cell is individually pressurized but only one cell is capable of providing the necessary sealing force at any one time.

Still another object of this invention is the provision of an inflatable elastomeric dual cell seal assembly having separately pressurized inner and outer cells wherein, during normal operation, each cell is individually pressurized with the outer cell being in a fully extended inflated condition and providing the necessary sealing force and the inner cell is in a retracted unextended condition and, therefore, is not subject to contact from hard objects which would tend to damage the inner cell.

Yet another object of the present invention is the provision of an inflatable elastomeric dual cell seal assembly having separately pressurized inner and outer cells wherein, upon failure of the normal sealingly operative outer cell, the inner cell will fully extend to provide the necessary sealing force.

A still further object of the present invention is the provision of a separately pressurized inner and outer cell seal construction wherein the outer cell is maintained at a slightly higher pressure than the inner cell whereby the inner cell is maintained in a retracted non-sealing condition, while the outer cell is in a fully expanded sealingly operative condition.

These and other objects and advantages of the present invention will be apparent from the following drawings and description wherein:

FIG. 1 is a perspective view showing the multi-cell seal of this invention in an unpressurized deflated condition.

FIG. 2 is a cross-sectional view showing the seal mounted in a metallic supporting retainer structure which is spatially displaced from an adjacent mating structure having an edge against which the elastomeric sealing member or nib can seat and seal, with the seal shown in a nested deflated condition.

FIG. 3 is a cross-sectional view similar to that of FIG. 2 but showing the seal in an inflated condition with the sealing nib in contact with the adjacent edge of the complementary mating structure.

FIG. 4 is a cross-sectional view of the seal assembly prior to mounting in the retainer structure showing the inner and outer cells differentially pressurized with the outer cell fully extended and the inner cell retracted.

FIG. 5 is a cross-sectional view of the seal assembly mounted in the retainer structure but prior to installation in an aircraft showing the relative positions assumed by the structure upon failure of the outer cell, with the pressurized inner cell inflated and distended thereby causing the composite multi-celled seal to assume a position of maximum extension.

Referring specifically to the drawings, wherein like reference numerals have been used throughout the several views to designate like parts, and referring at first to FIG. 1, reference numeral 1 generally designates, in perspective, the fail-safe seal assembly of this invention in an unmounted, unpressurized deflated state. In general, the assembly comprises dual elastomeric cells with one cell being contained within the other. Thus, continuous outer cell wall 3 forms an outer pressure chamber 5 which contains inner cell wall 7 which, in turn, forms an inner pressure chamber 9 therein. The lower portion of cell wall 3 merges into a relatively heavy base section 15 which supports the seal assembly. Formed on the lower edges of the base 15 are weather-strip type holding means or legs 19 and 21. These downwardly projecting legs 19 and 21 fit into grooves formed in the lower inside corners of the seal retainer attachment structure 23 and extend longitudinally along the entire length of the seal. The outer ends of the projecting weather strip legs are generally circular in cross-section and are of a corrugated construction to provide a labyrinth type seal between the leg ends and the groove walls without bonding. Extending longitudinally along the exterior of the upper medial portion of cell wall 3 is vertically extending nib element 25 having friction and sealing grooves 27 located on its upper surface to provide a labyrinth seal when in contact with a planar surface. This portion of the seal 1 is the only part actually contacting and sealing against the edge or land 33 of the adjacent complementary portion of the bulkhead mating structure 29. To withstand the extremes of temperature and pressure to be encountered during the operation of supersonic aerial vehicles, the seal of our invention is preferably formed of silicone rubber reinforced with glass fabric.

FIG. 2 is a sectional view which, for the purpose of illustrating the seal itself, may be considered as being taken through FIG. 1 in the plane of line 2—2. However, this view also shows the seal mounted in the supporting retainer 23 in a fully retracted, unpressurized deflated state and adjacent to but not in sealing contact with land 33 of mating structure 29. Structure 29 would normally consist of an edge of an access door or hatch or it could be a door frame when the seal is mounted on the door panel itself. Pneumatic inlet tube 13 is shown extending through base 15, thence through cell wall 7 and into inner cell chamber 9 with tube 13 bonded to the cell wall 7 at opening 17. With the exception of the area immediately adjacent the outlet end of tube 11 which provides communication with inner chamber 5, cell wall 7 is bonded to the upper surface 16 of base 15 throughout its entire length. Lack of such bonding in the area around inlet tube 11 permits local lifting of cell wall 7 under the influence of a pressurized gas and unrestricted flow from inlet tube 11 into the outer cell chamber 5. As shown in this figure, cell walls 3 and 7, in an uninflated at-rest condition, each has a nested inwardly turned, concave configuration wherein by proper dimensioning it is possible to have the upper edges of the cell walls and nib 25 all lying within the envelope formed by the plane of the upper edges of retainer 23. Thus, in such an uninflated condition, the seal member may be protected from abuse and wear by the shielding retainer member. Upon depressurization of the inflated seal assembly, the resiliently distensible cell walls return to this uninflated configuration to which they were initially molded.

FIG. 3 illustrates the structure and arrangement of FIG. 2 in fully pressurized sealing engagement with land 33. In this condition cell wall 3 has distended outwardly under pressure, thereby raising nib 25 into sealing contact with land 33. Outer cell wall 3 has now risen above the protecting walls of retainer 23 and is now vulnerable to damage. Note, however, that inner cell wall 7 is still within the confines of such structure and thus remains protected.

It is a major feature of the present dual cell construction that by differentially pressurizing the two cells the inner cell may always be retained in a retracted configuration during normal operation of the assembly wherein the outer cell provides the required sealing force. Such differential pressurization entails maintaining a slightly higher pressure in the outer cell chamber 5 than that in inner cell chamber 9 thereby causing cell 7 to remain retracted while outer cell 3 is operative. A pressure differential as small as 2 p.s.i. has been found sufficient for the stated purpose. Upon failure of cell wall 3 for any reason and the depressurization of outer chamber 5, inner cell 7 thereupon expands to provide the necessary sealing force. Since cell wall 7 is separated from cell wall 3 by the gas confined within chamber 5 and is retracted and not in contact with the outer cell wall 5, it is protected from blows, pinching, sharp instruments and the other abuse to which the outer cell wall is often subjected. Thus, this arrangement provides not only a fail-safe seal having an additional safety factor of 100% over that of a single cell seal but it also provides additional protection to the fail-safe inner seal itself.

In a typical installation of an unpressurized seal ¾″ in width and ⅝″ in height, the nominal gap between seal and land prior to inflation is approximately ⅛″. With the seal inflated by air or an inert gas to an optimum operating pressure of 27 p.s.i.g. for the inner cell and 29 p.s.i.g. for the outer cell and subjected to a differential test pressure of 11 p.s.i. across the seal, leakage across the seal i.e., between the sealing grooves 27 and the contacted edge 33, has been found normally not to exceed 0.0001 cubic ft. per minute per lineal inch.

FIG. 4 illustrates the dual cell assembly of the present invention in an unmounted condition, with the preferred full pressurization of 29 p.s.i. applied to chamber 5 and 27 p.s.i. applied to chamber 9. This figure illustrates the assembly in a fully distended unrestrained condition and indicates in a pictorial but graphic way, by comparison with FIG. 3, the sealing force that may be obtained at the interface between nib 25 and land 33 when the assembly is restrained from its maximum distention.

FIG. 5 illustrates the seal mounted in retainer 23 but without showing the adjacent mating frame 29. As shown herein, outer cell wall 3 is unpressurized, as when it is in a failed state, and the fail-safe feature of the seal has come into operation with inner cell wall 7 being expanded outwardly into direct contact with cell wall 3. In this manner inner cell 7 pressurizes and distends the whole seal assembly and provides the necessary sealing force to extend nib 25 into firm contact with land 33.

From the above description it will be seen that we have provided a unique multi-celled elastomeric seal assembly having a degree of fail safety heretofore unknown.

While a particular embodiment of this invention has been illustrated and described herein, it will be apparent that various changes and modifications may be made in the construction and arrangement of the various parts without departing from the spirit and scope of this invention in its broader aspects or as defined in the following claims.

We claim:

1. A sequentially expandible dual chambered inflatable sealing strip assembly for sealing against gas leakage between relatively movable members wherein such leakage tends to result from a pressure differential existing across the members comprising a generally U-shaped longitudinally extending channel member adapted to be fixedly mounted with its closed end contacting one of such relatively movable members, said channel having an inwardly projecting ridge integral with each leg of said U-shaped channel member adapted to retain a sealing strip, a longitudinally existing sealing strip having a flexible base portion with outwardly projecting ridge portions contacting the bottom of said channel member below said inwardly projecting channel ridges and being retained thereby; an essentially annular first inflatable member integral with said base portion, said first inflatable member having a sealing edge adapted to contact the other of the movable members upon inflation of said first inflatable member whereby it is expanded to partially extend out of said channel member; a first means communicating through said base portion with the interior of said first inflatable member for inflating said first inflatable member, said first inflating means not projecting above the upper surface of said base portion; a second inflatable member disposed within said first inflatable member; a second means communicating through said base portion with the interior of said second inflatable member for inflating said second member, said second inflatable member having its longitudinally extending lower surface bonded to the upper surface of said flexible base portion except in the region of said first inflating means whereby when pressurized gas is applied to said first inflating means the lower surface of said second inflatable member is raised clear of said base portion in the unbounded regions to permit pressurized gas to be introduced into said first inflatable member through said first inflating means.

2. A sequentially expandible dual chambered inflatable sealing strip assembly as set forth in claim 1, wherein the upper portions of said first and second inflatable members are respectively configured to be depressed inwardly into a nested retracted configuration so that they do not extend above the legs of the channel when in an uninflated condition thereby permitting freedom of movement between said relatively movable members.

3. A sequentially expandible dual chambered inflatable sealing strip assembly as set forth in claim 1, wherein said first and second inflatable members are differentially pressurized with said second inflatable member being at a slightly lower pressure than said first inflatable member whereby said second member normally remains in a retracted position within the walls of the channel when said first member is inflated to extend its sealing edge into sealing contact with the other of the movable members but upon loss of pressure in said first inflatable member said second inflatable member will automatically expand and hold the sealing edge of said first member in sealing engagement with such other movable member.

References Cited by the Examiner

UNITED STATES PATENTS

| | | | |
|---|---|---|---|
| 1,506,161 | 8/24 | Caldwell | 152—340 |
| 2,045,341 | 6/36 | Bourdon | 152—340 |
| 2,150,648 | 3/39 | Eger | 152—342 |
| 2,608,235 | 8/52 | Wyman | 152—340 |
| 2,832,618 | 4/58 | Knoll et al. | |
| 3,042,980 | 7/62 | Brinsmade | 20—69 |

FOREIGN PATENTS 445,683   2/49   Italy.

HARRISON R. MOSELEY, *Primary Examiner.*

JEROME SCHNALL, *Examiner.*